United States Patent
Zhu et al.

(10) Patent No.: US 7,950,617 B2
(45) Date of Patent: May 31, 2011

(54) SUPPORT DEVICE AND ELECTRONIC DEVICE HAVING THE SAME

(75) Inventors: Hong-Wei Zhu, Shenzhen (CN);
Er-Zheng Zhao, Shenzhen (CN);
Hai-Yang Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 332 days.

(21) Appl. No.: 12/346,873

(22) Filed: Dec. 31, 2008

(65) Prior Publication Data
US 2010/0102190 A1    Apr. 29, 2010

(30) Foreign Application Priority Data
Oct. 24, 2008    (CN) .......................... 2008 1 0305168

(51) Int. Cl.
*A47F 1/14*    (2006.01)
*A47G 1/16*    (2006.01)
*B60R 1/02*    (2006.01)

(52) U.S. Cl. ........ 248/469; 248/454; 248/461; 248/466; 248/455

(58) Field of Classification Search .................. 248/466, 248/469, 470, 471, 472, 474, 461, 454, 455, 248/457
See application file for complete search history.

(56) References Cited

U.S. PATENT DOCUMENTS

| | | | |
|---|---|---|---|
| 5,082,230 A * | 1/1992 | Chang | 248/476 |
| 7,150,440 B2 * | 12/2006 | Yuan | 248/372.1 |
| 7,239,506 B2 * | 7/2007 | Ogawa et al. | 361/679.22 |
| 7,301,759 B2 * | 11/2007 | Hsiung | 361/679.27 |
| 2005/0001114 A1 * | 1/2005 | Ogawa | 248/127 |
| 2005/0253040 A1 * | 11/2005 | Yang | 248/688 |

* cited by examiner

*Primary Examiner* — Amy J Sterling
(74) *Attorney, Agent, or Firm* — Frank R. Niranjan

(57) ABSTRACT

A support device includes a support-receiving member, a sliding block, a support, and an elastic sheet. The support-receiving member defines a groove with one end thereof blocked to form a stop end and the other opened to form an exit end. The sliding block and the support are slidably juxtaposed in the groove from the stop end to the exit end and rotatably coupled. The support includes a contact portion extending away from an end near the sliding block. The elastic sheet is fixed to the support-receiving member at the exit end and extends a free end away from the exit end. The free end maintains contact with the contact portion during rotation of the support and presses the contact portion to pivot the support to be stopped by the support-receiving member, stationing the support at that position.

18 Claims, 8 Drawing Sheets

SUPPORT DEVICE AND ELECTRONIC DEVICE HAVING THE SAME

BACKGROUND

1. Technical Field

The present disclosure relates to a support device and an electronic device utilizing the support device.

2. Description of the Related Art

To support electronic devices on a surface, support devices are used. These support devices, extending outward from the electronic devices, use up a lot of space, adding substantially to the footprint of the electronic devices. Further, when the electronic devices are to be transported, the support devices present difficulty.

Therefore, it is desirable to provide a support device and an electronic device, which can overcome the limitations described.

DETAILED DESCRIPTION OF THE EMBODIMENTS

Embodiments of the present support device and electronic device will now be described in detail with reference to the accompanying drawings.

Figure 1:
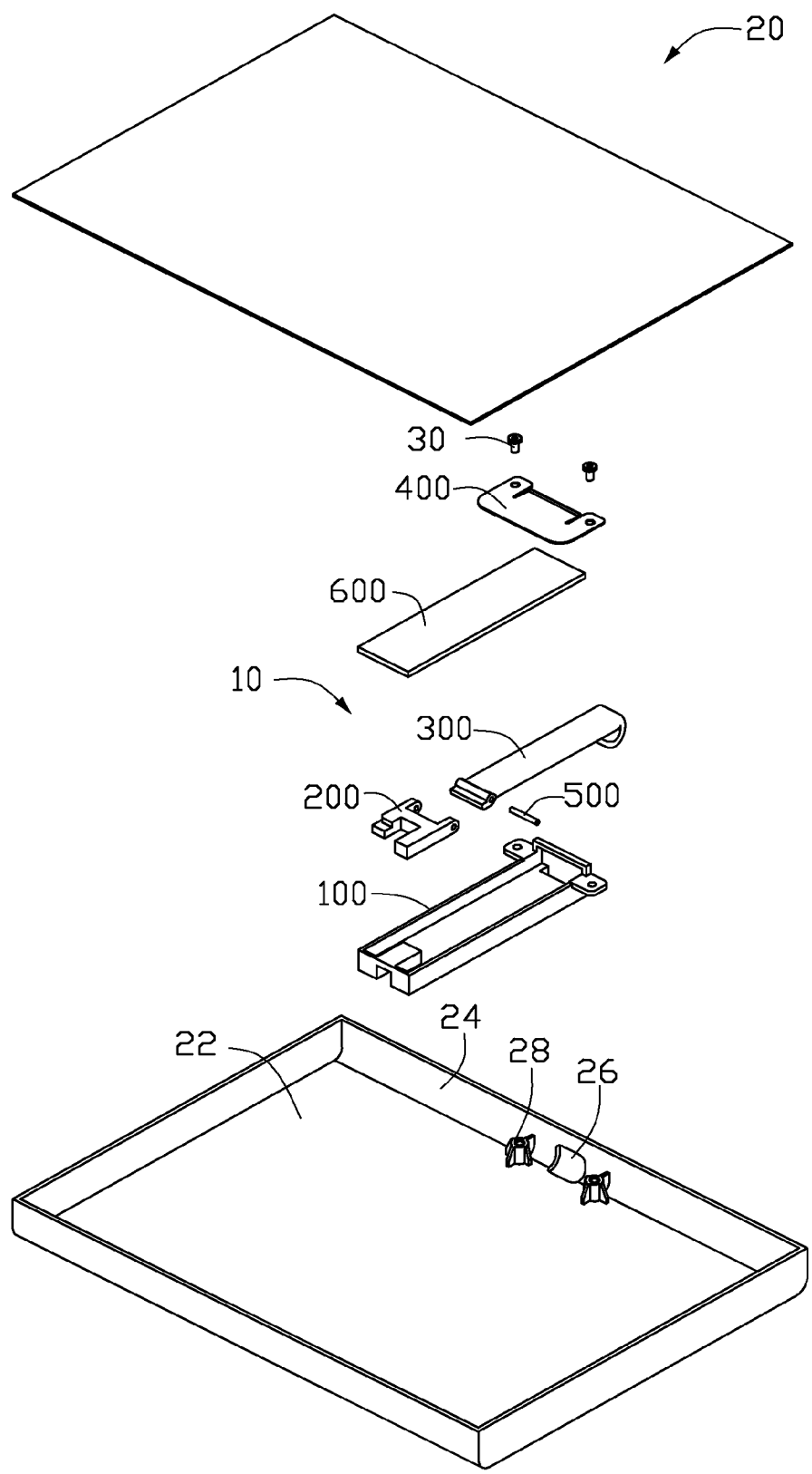
FIG. 1 is an isometric, exploded view of an electronic photo frame utilizing a support device that includes a support, according to an exemplary embodiment.
Figure 2:
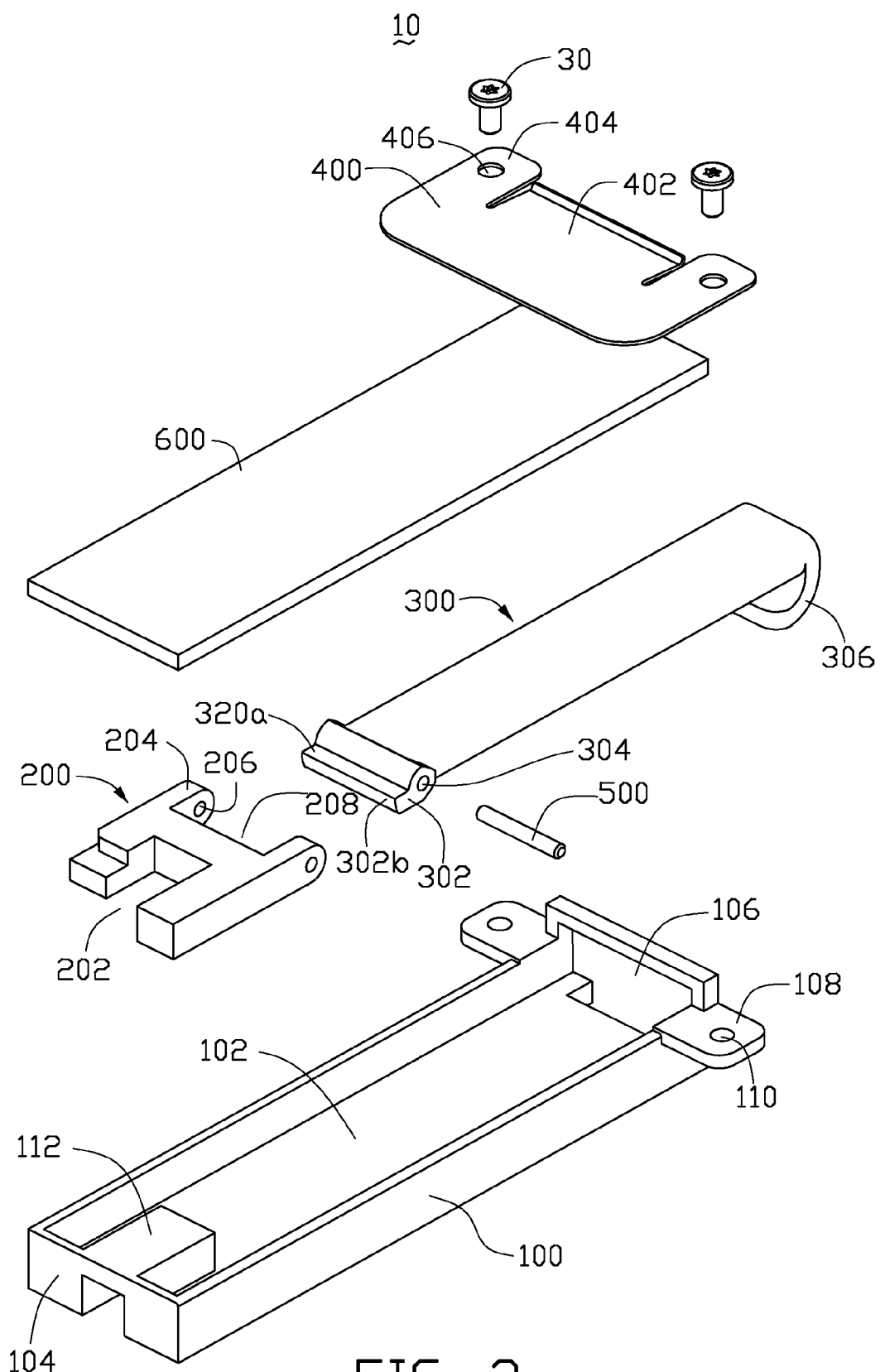
FIG. 2 is an isometric, enlarged, exploded view of the support device of FIG. 1.

Referring to FIGS. 1-2, a support device 10 in accordance with an exemplary embodiment is shown. The support device 10 can stably support objects on, for example, a desk. In this embodiment, the support device 10 supports an electronic photo frame 20. The electronic photo frame 20 includes a bottom housing plate 22 and a rear housing plate 24 adjacent thereto. A portion intersecting the bottom plate 22 and the rear housing plate 24 defines a support exit 26.

The support device 10 includes a support-receiving member 100, a sliding block 200, a support 300, an elastic sheet 400, and a pivot shaft 500.

The support-receiving member 100 is an elongate block. The support-receiving member 100 defines an elongate groove 102 parallel to the support-receiving member 100. One end of the groove 102 is blocked to form a limiting end 104. The other end of the groove 102 is an open end 106. The support-receiving member 100 further includes a pair of ears 108. Each ear 108 extends outwards from a corresponding side of the open end 106, substantially perpendicular to the longitudinal axis of the support-receiving member 100. Each ear 108 defines a first fixing hole 110. The limiting end 102 forms an engagement block 112. The engagement block 112 protrudes inwards the groove 102, along the longitudinal axis of the groove 102.

The sliding block 200 is H-shaped. Accordingly, the sliding block 200 includes two pairs of parallel arms 204. One pair of arms 204 defines a connecting space 208. Each arm 204 defines a fulcrum hole 206. The two fulcrum holes 206 face and are aligned with each other. The other pair of arms 204 also defines a stopping space 202.

Figure 8:
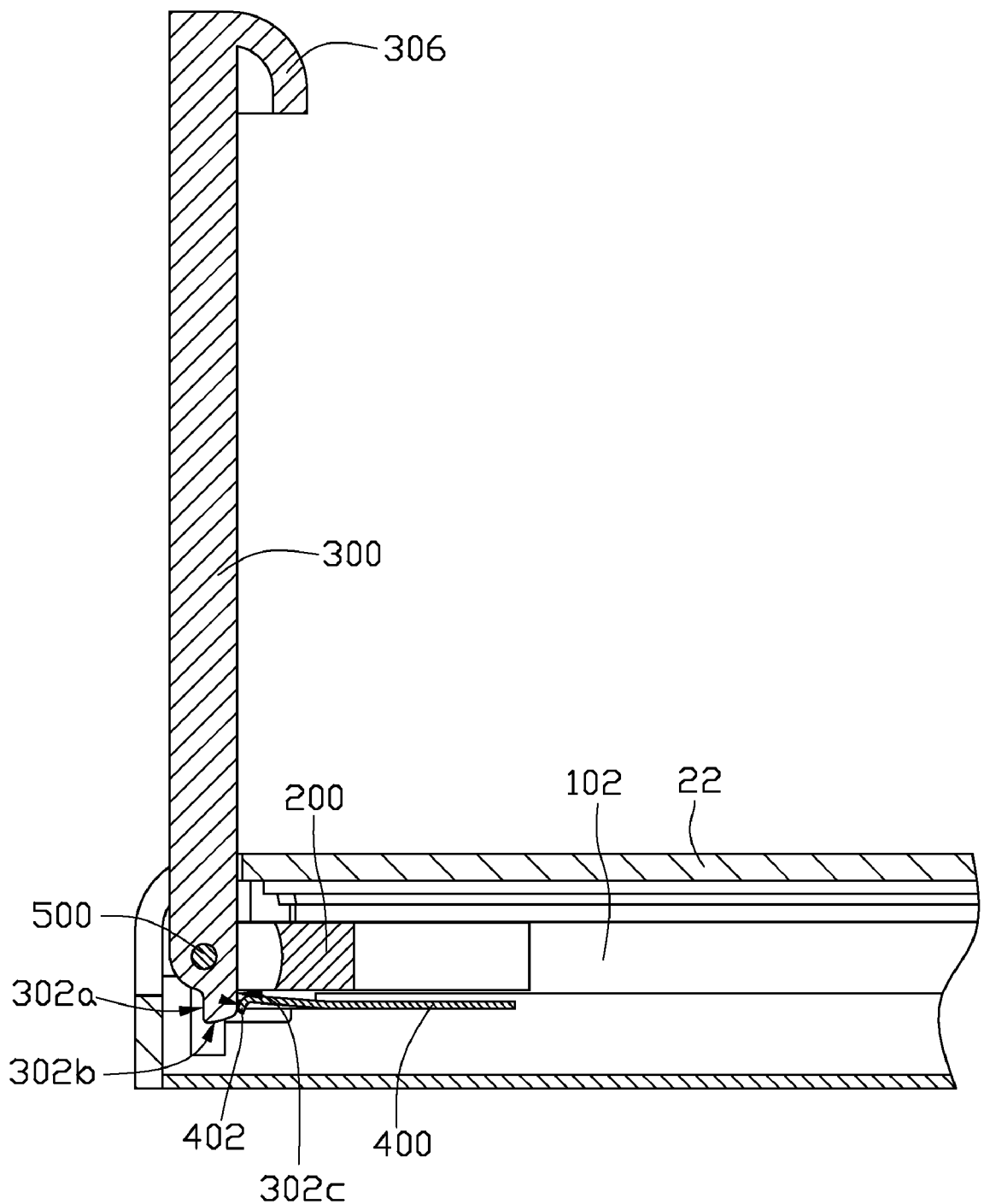
FIG. 8 is a schematic cross-section of the electronic photo frame of FIG. 7 taken along line VIII-VIII.

The support 300 is a strip-shaped plate. The support 300 includes a connecting portion 302 and a tail 306. The connecting portion 302 extends outwards from one end of the support 300. The tail 306 extends outwards from the other end of the support 300 and is rolled backwards to the support 300. That is, the tail 306 is curved. A portion of the connecting portion 302 adjacent to the support 300 defines a pivot hole 304. The extending direction of the pivot hole 304 is substantially perpendicular to the longitudinal axis of the support 300. The connecting portion 302 forms a face-up surface 302a, a transition surface 302b, and a face-down surface 302c (see FIG. 8). The face-up surface 302a and face-down surface 302c are planar and parallel to the longitudinal axis of the support 300. The transition surface 302b is convex. The transition surface 302b connects the face-up surface 302a and the face-down surface 302c.

The elastic sheet 400 is rectangular and includes a free portion 402. The free portion 402 extends outwards from one of the two long edges of the elastic sheet 400. The elastic sheet 400 also includes two fixing wings 404. The fixing wings 404 extend outwards from the long edge of the elastic sheet 400, from which the free portion 402 extends, along the extending direction of the free portion 402. The fixing wings 404 and the free portion 402 are substantially on the same plane. The fixing wings 404 are parallel and intervened by the free portion 402. Each fixing wing 404 defines a second fixing hole 406.

In assembly, the support-receiving member 100 is disposed on the rear housing plate 22 so that the open end 106 aligns with and is adjacent to the support exit 26. In particular, the rear housing plate 22 forms two support members 28. The two support members 28 are adjacent to the support exit 26. Each support member 28 defines a screw hole (not labeled). The support-receiving member 100 is disposed on the rear housing plate 22 so that each first fixing hole 110 is aligned with a corresponding screw hole of the support member 28.

The sliding block 200 is pivotally connected to the support 300 via the pivot shaft 500. In particular, the connecting portion 302 is received in the connecting space 208. The pivot hole 304 is aligned with the two fulcrum holes 206. The pivot shaft 500 enters the two fulcrum holes 206 and the pivot hole, rotatably connecting the sliding block 200 and the support 300. The connected sliding block 200 and the support 300 is disposed in the groove 102 such that the sliding block 200 is positioned at the limiting end 104 and accordingly support 200 is positioned at the open end 106.

The elastic sheet 400 is disposed on the ears 108 so that each second fixing hole 406 aligns with a corresponding first fixing hole 110 and a corresponding screw hole of the support member 28. The electronic photo frame 20 further includes a pair of screws 30. Each screw 30 enters a corresponding second fixing hole 406, a corresponding first fixing hole 110, and a corresponding screw hole of the support member 28, fastening the elastic sheet 400 and the support-receiving member 100 to the rear housing plate 22. It should further be understood that the assembly of rear housing plate 22, the support-receiving member 100, and the elastic sheet 400 is not limited to that disclosed, and that other fixing techniques, such as adhesion can alternatively be employed while remaining well within the scope of the disclosure.

Figure 3:
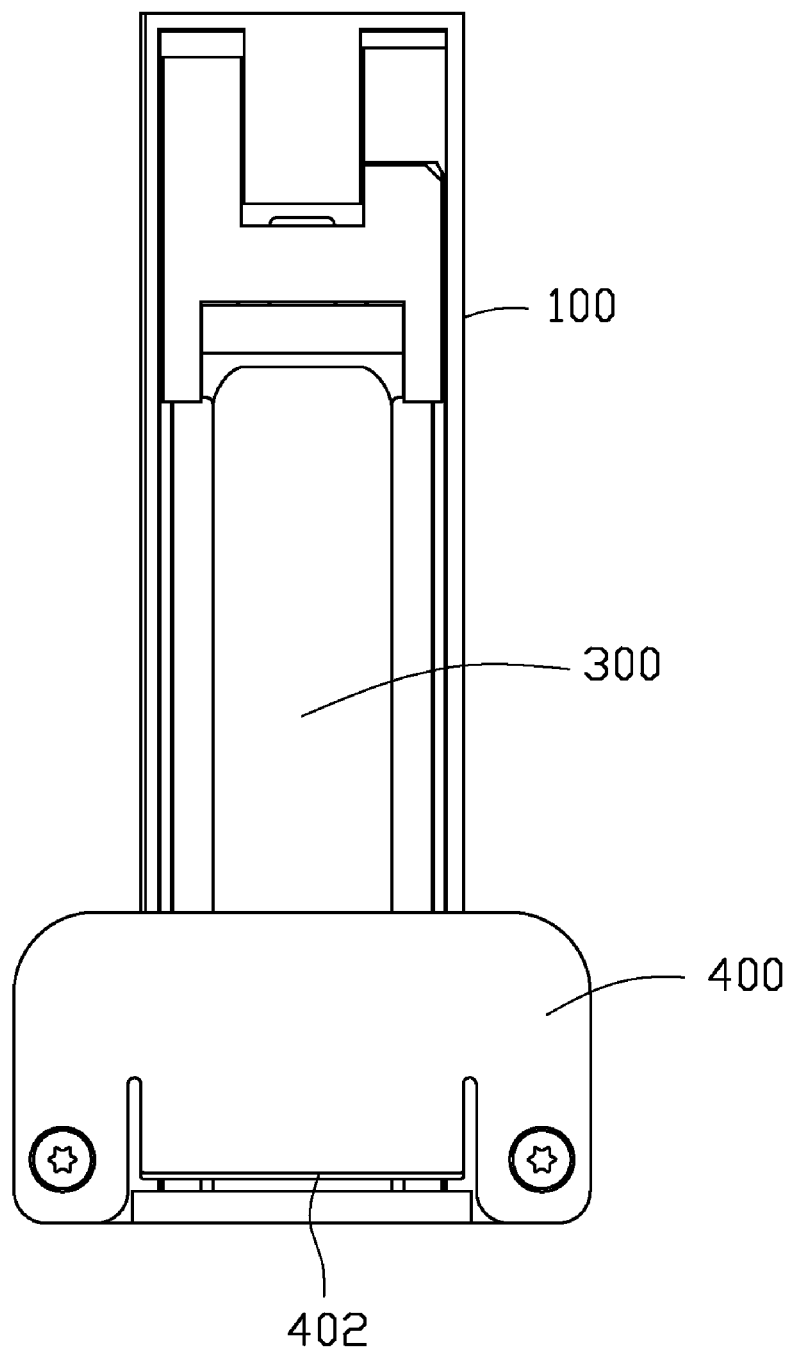
FIG. 3 is a planar, assembled view of the support device of FIG. 1.
Figure 4:
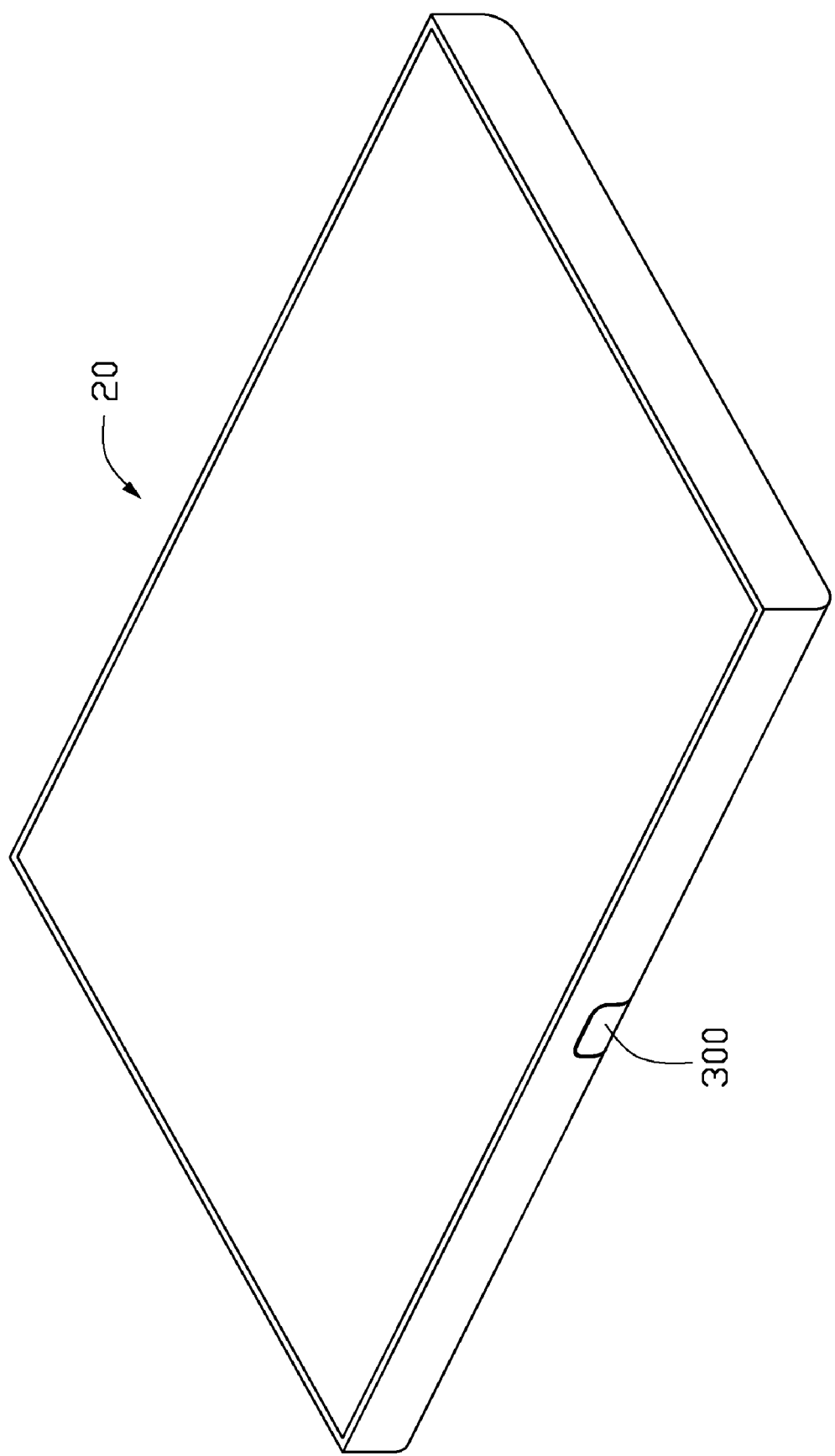
FIG. 4 is an isometric, assembled view of the electronic photo frame of FIG. 1, with the support received in the support device.

In operation, also referring to FIGS. 3-4, when the electronic photo frame 20 is not in use, the support 300 is received in the groove 102. Length of the groove 102 is at least the total length of the sliding block 200 and the support 300, such that support 300 can be entirely received within the groove 102. It should be mentioned that when the support 300 is pushed into the groove 102, the engagement block 112 and the stopping space 202 fittingly engage. As a result, when the support 300 is pushed into the groove 102 as shown in FIG. 4, the sliding block 200 grasps the engagement block 112, maintaining the connected sliding block 200 and support 300 within the groove 102. It also should be noted that the tail 306 can be shaped so as to seal the support exit 26.

Figure 5:
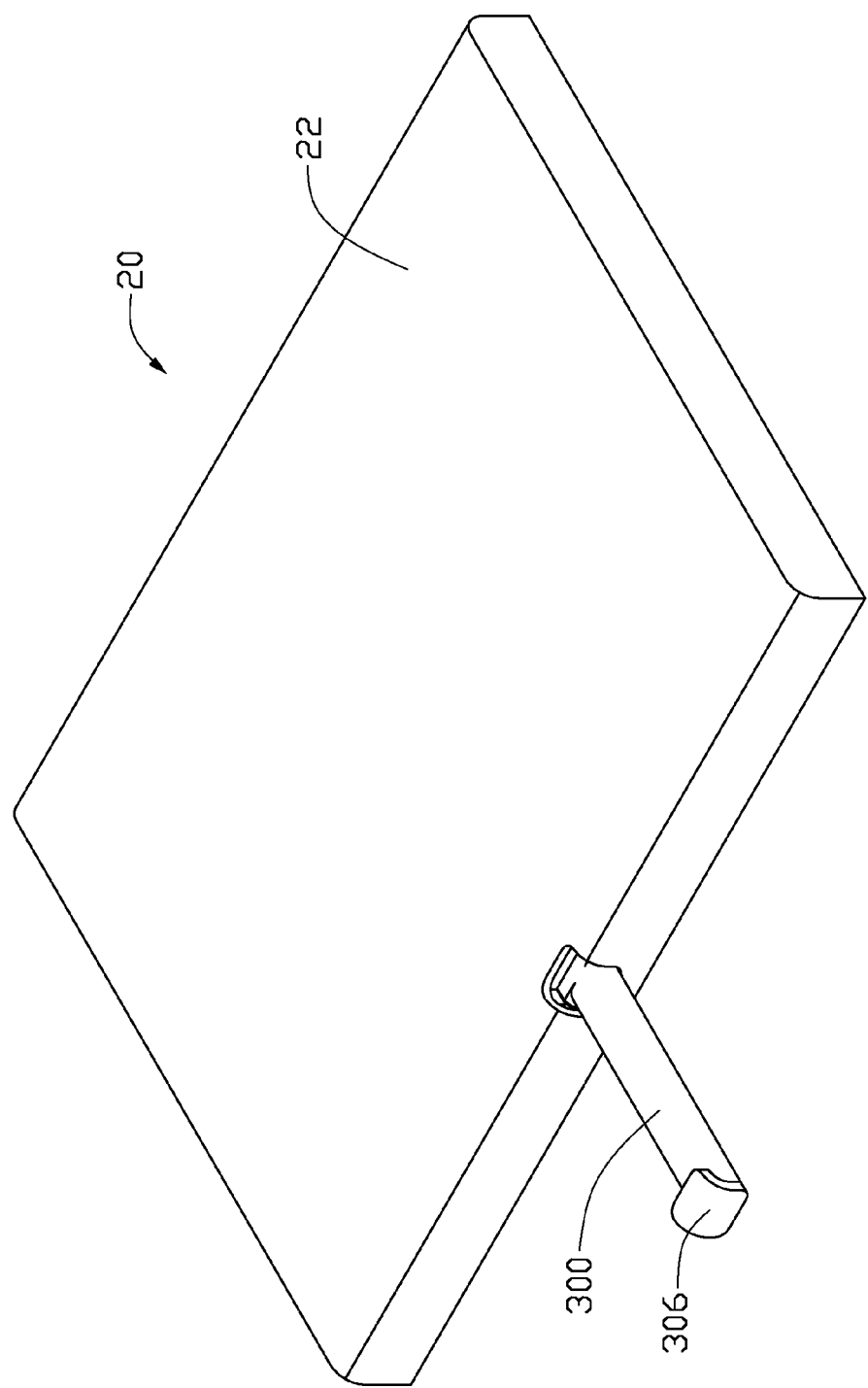
FIG. 5 is an isometric, assembled view of the electronic photo frame of FIG. 1, with the support deployed from the support device.
Figure 6:
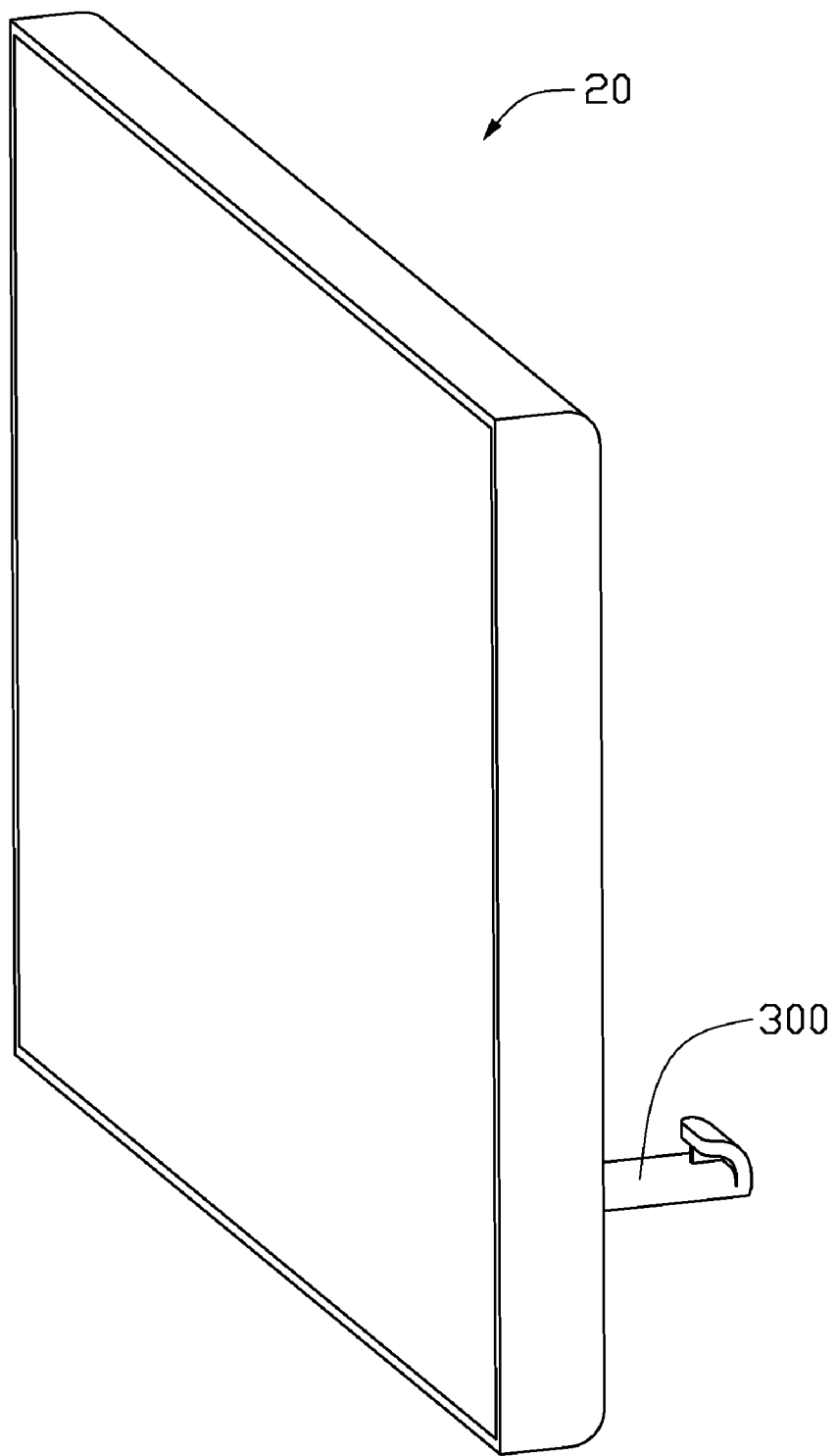
FIG. 6 is an isometric, assembled view of the electronic photo frame of FIG. 1, with the support in an erect position.
Figure 7:
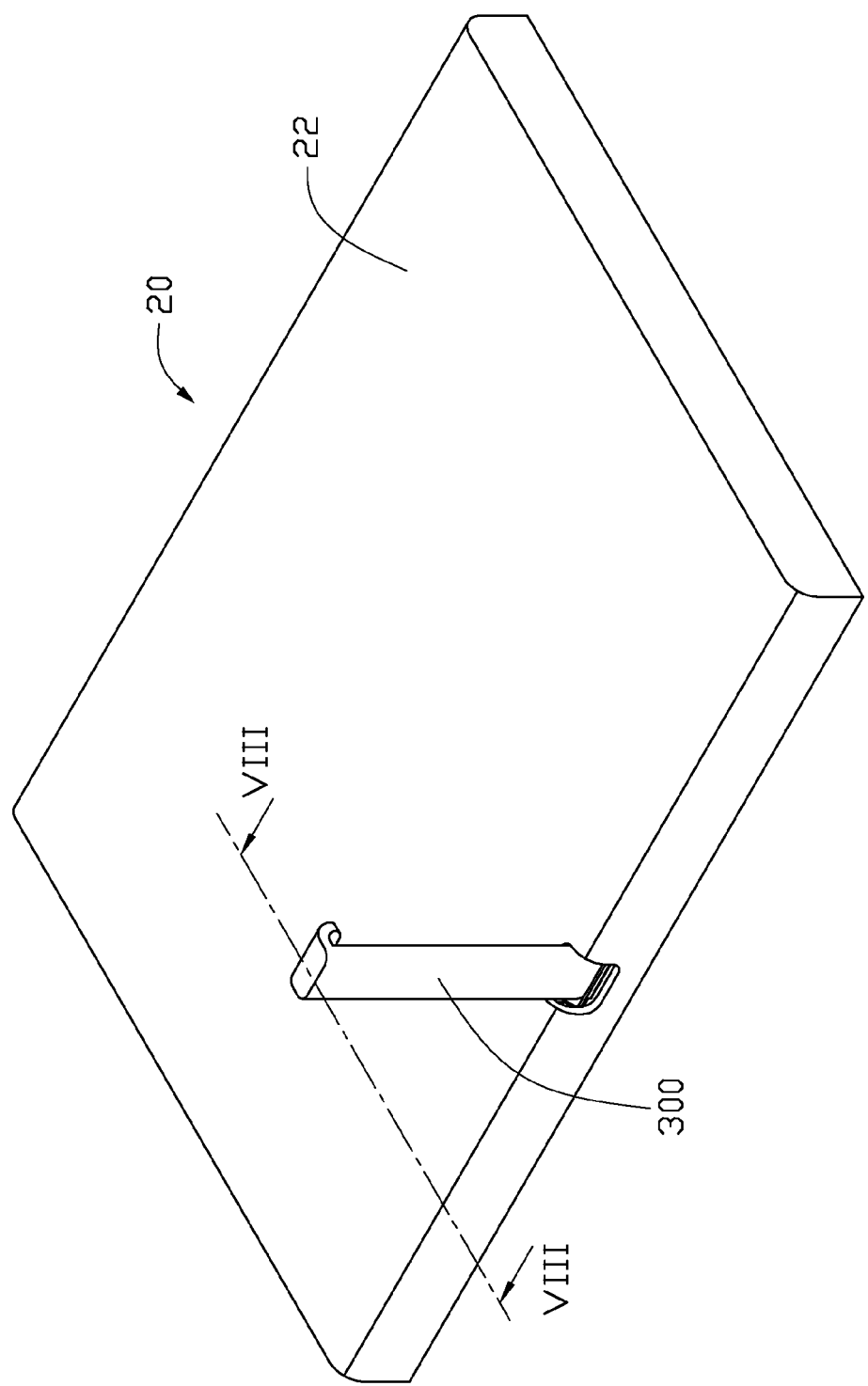
FIG. 7 is an isometric, assembled view of the electronic photo frame of FIG. 6, viewed from another angle.

Also referring to FIG. 5, to deploy the electronic photo frame 20, the support 300 is withdrawn from groove 102, via the open end 106 and the support exit 26. The support 300 assumes a position where the face-up surface 302a faces the free portion 402. The support 300 is rotated to an erect position (see FIGS. 6-8).

The rotation of support 300 takes place in a first stage, in which the free portion 402 is bent by the face-up surface 302a. The bent free portion 402 exerts an elastic force on the connecting portion 302, in a inverse direction of the rotation of the support 300, such that support 300 returns to the position shown in FIG. 5, once external rotation force is removed. If external rotation force continues, the free portion 402 slides past the face-up surface 302 to the transition surface 302b.

In a subsequent second stage, the free portion 402 is bent by the transition surface 302b. If the external rotation force is removed, due to the angle of the transition surface 302b, the free portion 402 can slide forwards or backwards. If the external rotation force continues, the free portion 402 slides past the transition surface 302b to a face-down surface 302c.

In a third and final stage, the elastic force is generated by the bent free portion 402 in the direction of the rotation of the support 300, which can further rotate without application of external rotation force. Rotation of the support 300 is, however, stopped by the rear housing plate 22 (see FIG. 8). The support 300 is balanced in the erect position. It should be mentioned that in other alternative embodiments, the rotation of the support 300 can be stopped by the support-receiving member 100.

It also should be understood that a cover 600 can be provided by the support device to cover the groove. In this embodiment, the cover 600 can be attached to the support-receiving member 100 via adhesive.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A support device for an object, the object comprising a bottom housing plate and a side housing plate adjacent thereto, with a joint of the bottom and side plates defining a through hole, the support device comprising:
   a support-receiving member defining a groove, one of two ends of the groove being blocked to form a stop end and the other open to form an exit end, the support-receiving member being fixed to the side housing plate with the exit end adjacent to the through hole;
   a sliding block slidably disposed in the groove at the stop end;
   a support slidably disposed in the groove at the exit end and rotatably coupled to the sliding block, the support comprising a contact portion extending away from an end thereof near the sliding block; and
   an elastic sheet fixed to the support-receiving member at the exit end and extending a free end outwards the exit end, the free end maintaining contact with the contact portion during rotation of the support, and pressing the contact portion to pivot the support to be stopped by the support-receiving member or the side housing plate, thereby stationing the support in that position.

2. The support device as claimed in claim 1, wherein the rear housing plate forms two threaded portions close to the through hole, the object comprising two short screws, the support-receiving member extending two wings out from the exit end towards corresponding threaded portions, each of the two wings defining a first hole aligned with a corresponding threaded portion, the support-receiving member being fixed to the side housing plate by the short screws passing the first holes and into the threaded portions.

3. The support device as claimed in claim 2, wherein the elastic sheet extends out two second wings towards corresponding threaded portions, each of the second wings defining a second hole, the elastic sheet being fixed to the support-receiving member by the short screw passing through the second holes, the first holes and into the threaded portions.

4. The support device as claimed in claim 1, wherein the groove is no shorter than the total length of the sliding block and the support.

5. The support device as claimed in claim 1, wherein the support-receiving member comprises an insertion block protruding inwardly along the groove from the stop end, the sliding block defining a maintaining groove fitting into the insertion block.

6. The support device as claimed in claim 1, wherein the sliding block protrudes two fulcrum arms towards the support, each defining a fulcrum hole, with the support extending a pressing block away from an end contacting the sliding block, the pressing block defining a rotation hole aligned with the fulcrum holes, and the support device further comprising a rotating shaft passing through the fulcrum holes and the rotation hole.

7. The support device as claimed in claim 1, wherein the support comprises a sealing leaf rolled backward at the end far away the sliding block and shaped so as to seal the through hole of the side and bottom housing plates.

8. A support device comprising:
   a support-receiving member defining a groove, one of two ends of the groove being blocked to form a stop end and the other being open to form an exit end;
   a sliding block slidably disposed in the groove at the stop end;
   a support slidably disposed in the groove at the exit end and rotatably coupled to the sliding block, the support comprising a contact portion extending away from an end thereof near the sliding block; and
   an elastic sheet fixed to the support-receiving member at the exit end and extending a free end towards the exit end, the free end maintaining contact with the contact portion during rotation of the support, and pressing the contact portion to pivot the support to be stopped by the support-receiving member, thereby stationing the support at that position.

9. The support device as claimed in claim 8, wherein the groove is no shorter than the total length of the sliding block and the support.

10. The support device as claimed in claim 8, wherein the support-receiving member comprises an insertion block protruding inwardly along the groove from the stop end, the sliding block defining a maintaining groove fitting into the insertion block.

11. The support device as claimed in claim 8, wherein the sliding block protrudes two fulcrum arms towards the support, each of the fulcrum arms defining a fulcrum hole, the support extending a pressing block away from an end in contact with the sliding block, and the pressing block defining a rotation hole aligned with the fulcrum holes, with the support device further comprising a rotating shaft passing through the fulcrum holes and the rotation hole.

12. An electronic device, comprising:
a bottom housing plate;
a side housing plate adjacent to the bottom housing plate, a joint of the bottom and side plates defining a through hole;
a support device comprising:
a support-receiving member defining a groove, one of two ends of the groove being blocked to form a stop end and the other being open to form an exit end, the support-receiving member being fixed to the side housing plate with the exit end adjacent to the through hole;
a sliding block slidably disposed in the groove at the stop end;
a support slidably disposed in the groove at the exit end and rotatably coupled to the sliding block, the support comprising a contact portion extending away from an end thereof near the sliding block; and
an elastic sheet fixed to the support-receiving member at the exit end and extending a free end outwards the exit end, the free end maintaining contact with the contact portion during rotation of the support, and pressing the contact portion to pivot the support to be stopped by the side housing plate, thereby stationing the support at that position.

13. The support device as claimed in claim 12, wherein the rear housing plate forms two threaded portions close to the through hole, and the object comprising two short screws, the support-receiving member extending two wings out from the exit end towards corresponding threaded portions, each of the two wings defining a first hole aligned with a corresponding threaded portion, the support-receiving member being fixed to the side housing plate by the short screws passing through the first holes and into the threaded portions.

14. The support device as claimed in claim 13, wherein the elastic sheet extends out two second wings towards corresponding threaded portions, with each of the second wings defining a second hole, the elastic sheet being fixed to the support-receiving member by the short screws passing through the second holes, the first holes and into the threaded portions.

15. The support device as claimed in claim 12, wherein the groove is no shorter than the total length of the sliding block and the support.

16. The support device as claimed in claim 12, wherein the support-receiving member comprises an insertion block protruding inwardly along the groove from the stop end, the sliding block defining a maintaining groove fitting into the insertion block.

17. The support device as claimed in claim 12, wherein the sliding block protrudes two fulcrum arms towards the support, each of the fulcrum arms defining a fulcrum hole, with the support extending a pressing block away from an end in contact with the sliding block, the pressing block defining a rotation hole aligned with the fulcrum holes, and the support device further comprising a rotating shaft passing through the fulcrum holes and the rotation hole.

18. The support device as claimed in claim 12, wherein the support comprises a sealing leaf rolled backward at the end far away the sliding block and shaped so as to seal the through hole of the side and bottom housing plates.

* * * * *